United States Patent
Chang et al.

(10) Patent No.: US 9,525,761 B1
(45) Date of Patent: Dec. 20, 2016

(54) MOBILE COMMUNICATION DEVICE

(71) Applicant: Acer Incorporated, New Taipei (TW)

(72) Inventors: Kun-Sheng Chang, New Taipei (TW); Ching-Chi Lin, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/958,912

(22) Filed: Dec. 3, 2015

(30) Foreign Application Priority Data

Sep. 4, 2015 (TW) .............................. 104129400 A

(51) Int. Cl.
*H04M 1/00* (2006.01)
*H04M 1/02* (2006.01)
*H04B 1/3827* (2015.01)

(52) U.S. Cl.
CPC ............. *H04M 1/02* (2013.01); *H04B 1/3838* (2013.01)

(58) Field of Classification Search
CPC .................. H01Q 1/242–1/245; H01Q 1/084; H04B 1/3833; H04B 1/3838
USPC ......... 455/90.1, 90.3, 550.1, 575.1, 575.5, 455/575.7, 333
See application file for complete search history.

(56) References Cited

U.S. PATENT DOCUMENTS

2012/0276958 A1* 11/2012 Inami .................. H04M 1/0237 455/566
2015/0075958 A1* 3/2015 Fang .................. H03K 17/9622 200/5 R

FOREIGN PATENT DOCUMENTS

TW 201336165 9/2013
TW 201528605 7/2015

* cited by examiner

*Primary Examiner* — Nhan Le
(74) *Attorney, Agent, or Firm* — Jianq Chyun IP Office

(57) ABSTRACT

A mobile communication device including a substrate, an antenna element and a sensing element is provided. The substrate includes a first surface and a second surface opposite to each other. The antenna element is disposed on the first surface and converts a feeding signal into an electromagnetic wave. The antenna element includes a first portion receiving the feeding signal and a second portion electrically connected to a ground. The sensing element is disposed on the second surface and generates a sensing signal in response to proximity of an object. An orthogonal projection of the sensing element on the first surface and an orthogonal projection of the second portion on the first surface are overlapped with each other and have the same shape.

10 Claims, 4 Drawing Sheets

MOBILE COMMUNICATION DEVICE

CROSS-REFERENCE TO RELATED APPLICATION

This application claims the priority benefit of Taiwan application serial no. 104129400, filed on Sep. 4, 2015. The entirety of the above-mentioned patent application is hereby incorporated by reference herein and made a part of this specification.

BACKGROUND OF THE INVENTION

Field of the Invention

The invention relates to a mobile communication device, and more particularly, to a mobile communication device having an antenna element and a sensing element.

Description of Related Art

In recent years, most of the existing mobile communication devices are disposed with a sensing element and a sensing controller in order to pass testing standard of specific absorption ratio (abbr., SAR). Further, when human body is proximate to the antenna element in the mobile communication device, the sensing controller can output a control signal in response to a sensing signal from the sensing element, so that the mobile communication device can reduce a radiation power of the antenna element to thereby reduce electromagnetic wave absorbed by human body. However, with developments in slim design for the mobile communication device, space available for disposing the antenna element and the sensing element in the mobile communication device is compressed correspondingly. As a result, a mutual interference between the antenna element and the sensing element may occur to degrade communication quality of the mobile communication device. Accordingly, it has become an important issue in terms of designing the mobile communication device as how to dispose the antenna element and the sensing element in the limited hardware space while reducing the mutual interference between the antenna element and the sensing element.

SUMMARY OF THE INVENTION

The invention is directed to a mobile communication device, which is capable of reducing the mutual interference between the antenna element and the sensing element and facilitating developments in slim design for the mobile communication device.

The mobile communication device of the invention includes a substrate, an antenna element and a sensing element. The substrate includes a first surface and a second surface opposite to each other. The antenna element is disposed on the first surface and converts a feeding signal into an electromagnetic wave. In addition, the antenna element includes a first portion receiving the feeding signal and a second portion electrically connected to a ground. The sensing element is disposed on the second surface and generates a sensing signal in response to proximity of an object. Furthermore, an orthogonal projection of the sensing element on the first surface and an orthogonal projection of the second portion on the first surface are overlapped with each other and have the same shape.

In an embodiment of the invention, the mobile communication device further includes a sensing controller. The sensing controller is electrically connected to a connection point of the sensing element to receive the sensing signal. The second portion of the antenna element is electrically connected to a ground through a ground point. An orthogonal projection of the connection point on the first surface and an orthogonal projection of the ground point on the first surface are overlapped with each other.

Based on the above, according to the mobile communication device of the invention, the antenna element and the sensing element are respectively disposed on the two surfaces of the substrate, and the orthogonal projection of the sensing element on the first surface and the orthogonal projection of the second portion of the antenna element on the first portion are overlapped and have the same shape. As a result, the hardware space occupied by the antenna element and the sensing element may be reduced, and the mutual interference between the antenna element and the sensing element may also be reduced.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
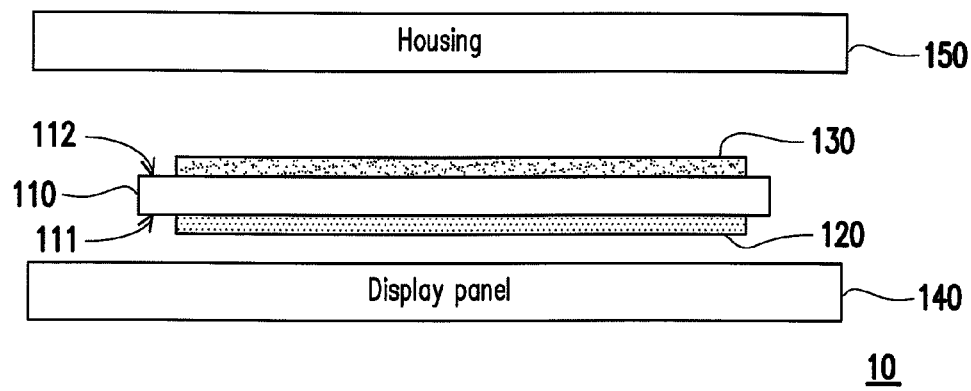
FIG. 1 is a schematic diagram of a mobile communication device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a mobile communication device according to an embodiment of the invention. As shown in FIG. 1, a mobile communication device 10 includes a substrate 110, an antenna element 120, a sensing element 130, a display panel 140 and a housing 150. The substrate 110 is disposed between the display panel 140 and the housing 150, and the housing 150 may be, for example, a back cover of the mobile communication device 10. Further, the substrate 110 has a first surface 111 and a second surface 112 opposite to each other. The antenna element 120 is disposed on the first surface 111 of the substrate 110, and the sensing element 130 is disposed on the second surface 112 of the substrate 110. In other words, the antenna element 120 faces the display panel 140, and the sensing element 130 faces the housing 150.

Figure 2:
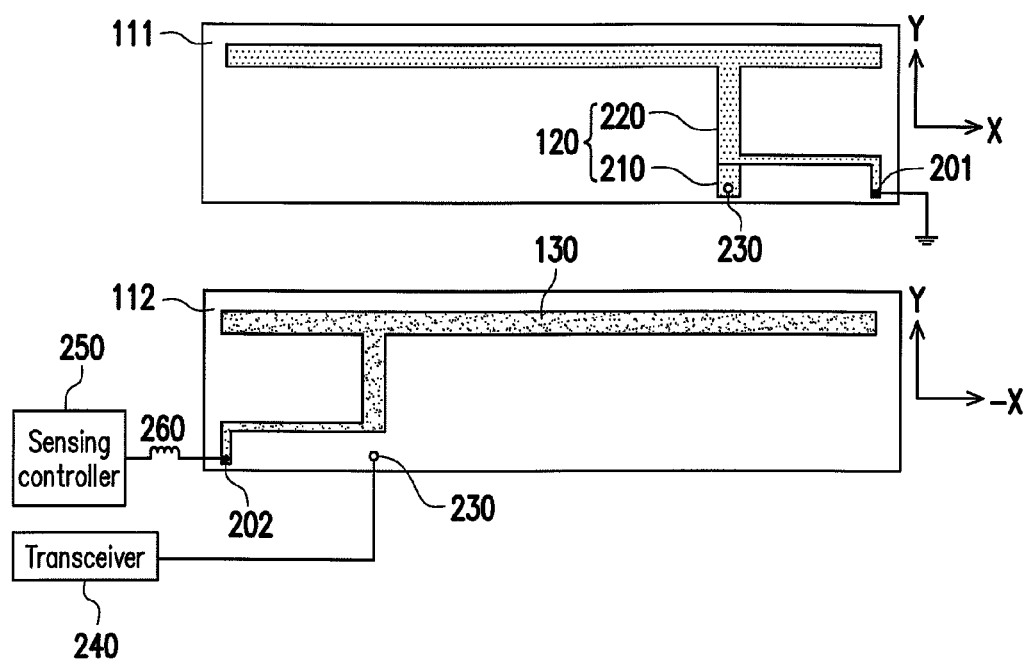
FIG. 2 illustrates a front view and a top view of the mobile communication device according to an embodiment of the invention.

FIG. 2 illustrates a front view and a top view of the mobile communication device according to an embodiment of the invention. For clear description, the display panel 140 and the housing 150 are not illustrated in FIG. 2. Further, an upper half portion of FIG. 2 illustrates the front view of the mobile communication device, and a lower half portion of FIG. 2 illustrates the top view of the mobile communication device.

As shown in FIG. 2, the antenna element 120 includes a first portion 210 and a second portion 220. A first end of the first portion 210 is electrically connected to the second portion 220, and a second end of the first portion 210 is configured to receive a feeding signal. For instance, the mobile communication device 10 further includes a conductive hole 230 and a transceiver 240. The transceiver 240 is configured to generate the feeding signal. The conductive hole 230 penetrates the second end of the first portion 210 and the substrate 110. In addition, the second end of the first portion 210 is electrically connected to the transceiver 240 through the conductive hole 230. In other words, the antenna element 120 can receive the feeding signal through the first portion 210. Furthermore, the second portion 220 of the antenna element 120 is electrically connected to a ground through a ground point 201. In terms of operation, the antenna element 120 can convert the feeding signal into an electromagnetic wave. In addition, the antenna element 120 may be, for example, an inverted F antenna. That is to say, the first portion 210 and the second portion 220 can form an inverted F antenna structure.

The sensing element 130 and the antenna element 120 are disconnected to each other. Further, the sensing element 130 can generate a sensing signal in response to proximity of an object. The mobile communication device 10 can adjust a radiation power of the antenna element 120 according to the sensing signal, so as to reduce influences caused by the antenna element 120 to human body. For instance, the mobile communication device 10 further includes a sensing controller 250. In terms of overall disposition, the transceiver 240 and the sensing controller 250 face the housing 150. The sensing controller 250 is electrically connected to a connection point 202 of the sensing element 130 to receive the sensing signal from the sensing element 130. The sensing controller 250 can generate a corresponding control signal according to the sensing signal, and the transceiver 240 can reduce intensity of the electromagnetic wave radiated by the antenna element 120 according to the control signal.

Figure 3:
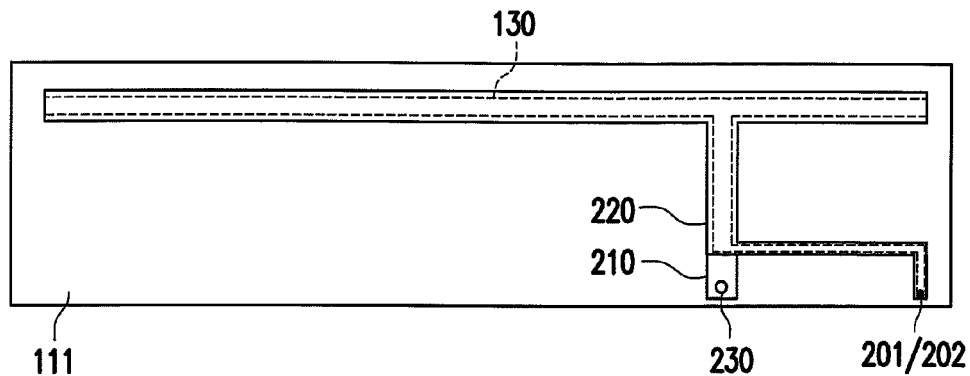
FIG. 3 is a perspective view of the mobile communication device according to an embodiment of the invention.

FIG. 3 is a perspective view of the mobile communication device according to an embodiment of the invention. As shown in FIG. 3, an orthogonal projection of the sensing element 130 on the first surface 111 and an orthogonal projection of the second portion 220 of the antenna element 120 on the first surface 111 are overlapped with each other. The orthogonal projections of the sensing element 130 and the second portion 220 on the first surface 111 have the same shape. It should be noted that, the sensing element 130 and the antenna element 120 are spaced apart by the substrate 110 and opposite to each other, and a thickness of the substrate 110 may fall between 0.1 mm to 0.8 mm. Accordingly, a parasitic capacitor may be generated between the sensing element 130 and the second portion 220 of the antenna element 120. The parasitic capacitor may be used to block low-frequency signals between the sensing element 130 and the antenna element 120, such that influences caused by the antenna element 120 to the sensing element 130 may be reduced. Furthermore, the parasitic capacitor may be regarded as a short circuit for high-frequency signals, such that influences caused by the sensing element 130 to the antenna element 120 may be reduced.

Figure 4:
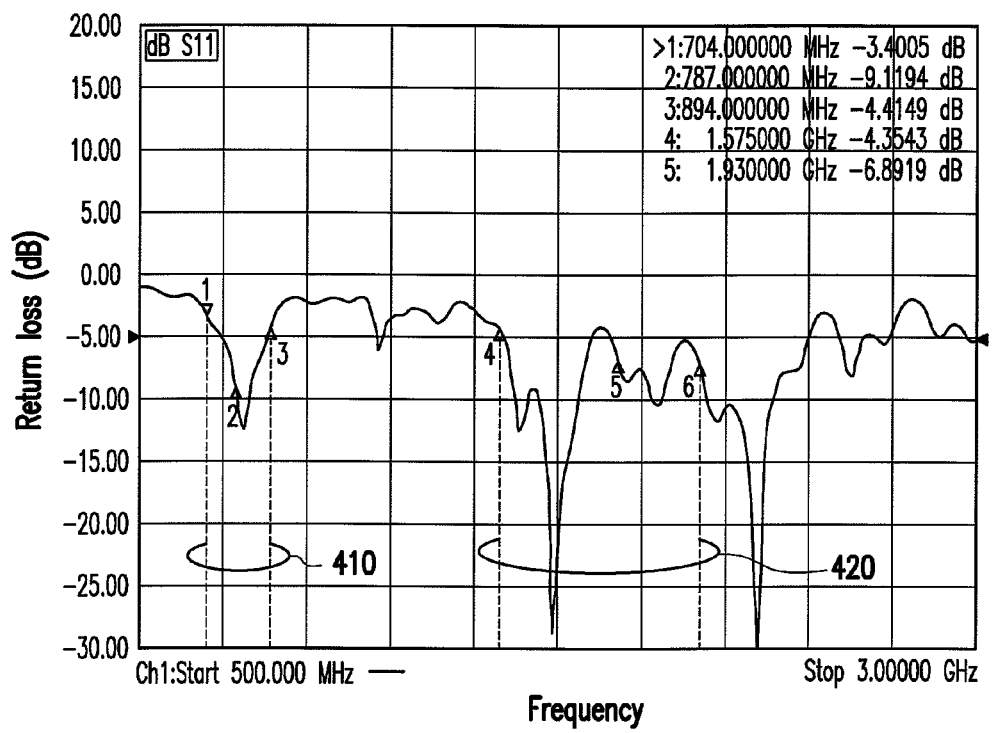
FIG. 4 is a return loss diagram of the antenna element according to an embodiment of the invention.

In other words, the antenna element 120 and the sensing element 130 are respectively disposed on the two opposite surfaces of the substrate 110 in the mobile communication device 10, so that the hardware space occupied by the antenna element 120 and the sensing element 130 may be reduced, so as to facilitate developments in slim design for the mobile communication device 10. In addition, because the orthogonal projection of the sensing element 130 on the first surface 111 and the orthogonal projection of the second portion 220 of the antenna element 120 on the first surface 111 are overlapped and have the same shape, the mutual interference between the antenna element 120 and the sensing element 130 may be reduced. For instance, FIG. 4 is a return loss diagram of an antenna element according to an embodiment of the invention. As shown in FIG. 4, for example, the antenna element 120 described in the embodiment of FIG. 2 may be operated in a first frequency band 410 and a second frequency band 420, and the return loss of the antenna element 120 is approximately below −3 dB in the first frequency band 410 and the second frequency band 420.

It should be noted that, as shown in FIG. 3, in a preferable embodiment, a width of the sensing element 130 is not greater than (i.e., less than or equal to) a width of the second portion 220 of the antenna element 120. Further, an orthogonal projection of the connection point 202 of the sensing element 130 on the first surface 111 and an orthogonal projection of the ground point 201 of the antenna element 120 on the first surface 111 are overlapped with each other. Accordingly, influences caused by the sensing element 130 to the antenna element 120 may be further reduced.

Furthermore, as shown in FIG. 2, in a preferable embodiment, the mobile communication device 10 further includes an inductor 260. The inductor 260 is electrically connected between the connection point 202 of the sensing element 130 and the sensing controller 250. In terms of operation, the inductor 260 can transmit the sensing signal generated by the sensing element 130, and may be used to block the high-frequency signals. Accordingly, influences caused by the antenna element 120 to the sensing element 130 may be further reduced. Further, in another embodiment, the inductor 260 may also be built-in in the sensing controller 250.

It is worth mentioning that, because the antenna element 120 in the mobile communication device 10 is described by taking the inverted F antenna structure as an example in the embodiment of FIG. 2, a shape of the sensing element 130 is similar to a part of a shape of the inverted F antenna structure. Although the embodiment of FIG. 2 illustrates an implementation pattern of the antenna element 120 and the sensing element 130, the invention is not limited thereto. For instance, the antenna element 120 may also include, for example, a loop antenna structure or a coupling-type monopole antenna structure, and the shape of the sensing element 130 may also be similar to, for example, a part of the loop antenna structure or the coupling-type monopole antenna structure.

Figure 5:
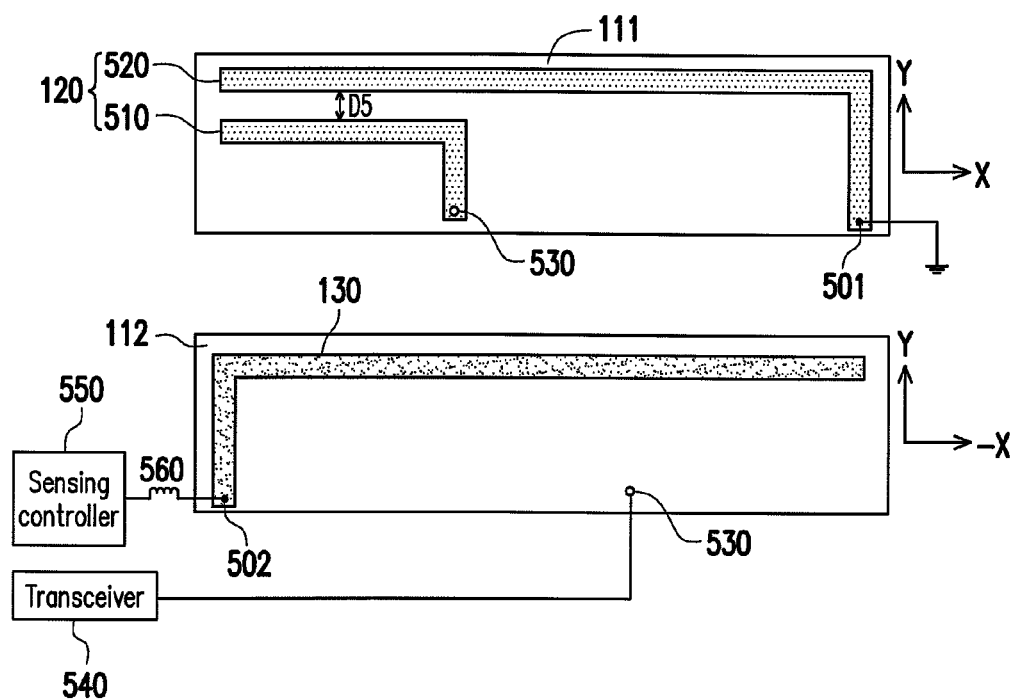
FIG. 5 illustrates a front view and a top view of the mobile communication device according to another embodiment of the invention.

For instance, FIG. 5 illustrates a front view and a top view of the mobile communication device according to another embodiment of the invention. As shown in FIG. 5, the antenna element 120 includes a first portion 510 and a second portion 520, and the mobile communication device 10 further includes a conductive hole 530, a transceiver 540, a sensing controller 550 and an inductor 560. A first end of the first portion 510 and the second portion 520 are spaced apart by a coupling distance D5, and a second end of the first portion 510 is electrically connected to the transceiver 540 through the conductive hole 530 to receive a feeding signal from the transceiver 540. Furthermore, the second portion 520 of the antenna element 120 is electrically connected to a ground through a ground point 501. Accordingly, the first portion 510 and the second portion 520 can form the coupling type monopole antenna structure.

Figure 6:
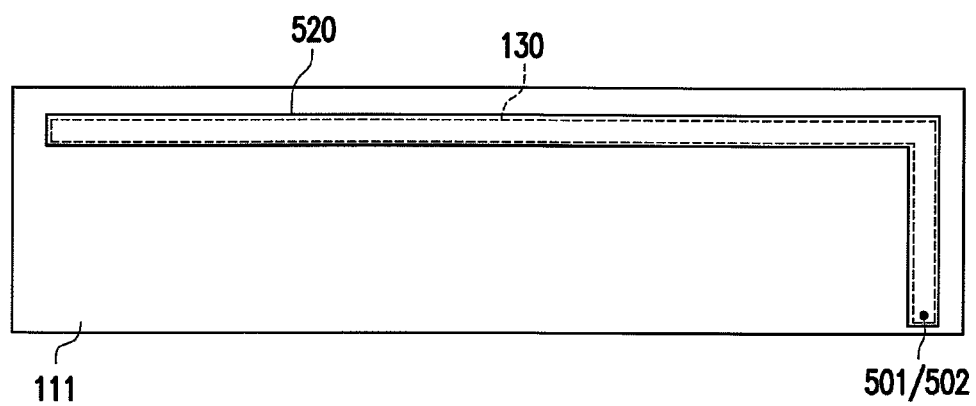
FIG. 6 is a perspective view of the mobile communication device according to another embodiment of the invention.

On the other hand, the sensing element 130 and the antenna element 120 are not electrically connected to each other in FIG. 5. Furthermore, the sensing element 130 is electrically connected to the sensing controller 550 through a connection point 502 and the inductor 560. FIG. 6 is a perspective view of the mobile communication device according to another embodiment of the invention. As shown in FIG. 6, an orthogonal projection of the sensing element 130 on the first surface 111 and an orthogonal projection of the second portion 520 of the antenna element 120 on the first surface 111 are overlapped with each other and have the same shape. Further, an orthogonal projection of the connection point 502 of the sensing element 130 on the first surface 111 and an orthogonal projection of the ground point 501 of the antenna element 120 on the first surface 111 are overlapped with each other.

In terms of operation, the antenna element 120 can convert a feeding signal into an electromagnetic wave, and the sensing element 130 can generate a sensing signal in response to proximity of an object. The sensing controller 550 can generate a corresponding control signal according to the sensing signal, and the transceiver 540 can reduce intensity of the electromagnetic wave radiated by the antenna element 120 according to the control signal, so as to reduce influences caused by the antenna element 120 to human body. Furthermore, a parasitic capacitor may be generated between the sensing element 130 and the second portion 520. The parasitic capacitor may be used to block low-frequency signals between the sensing element 130 and the antenna element 120, and the parasitic capacitor may be regarded as short circuit for high-frequency signals. Accordingly, the mutual interference between the antenna element 120 and the sensing element 130 may be effectively reduced.

Figure 7:
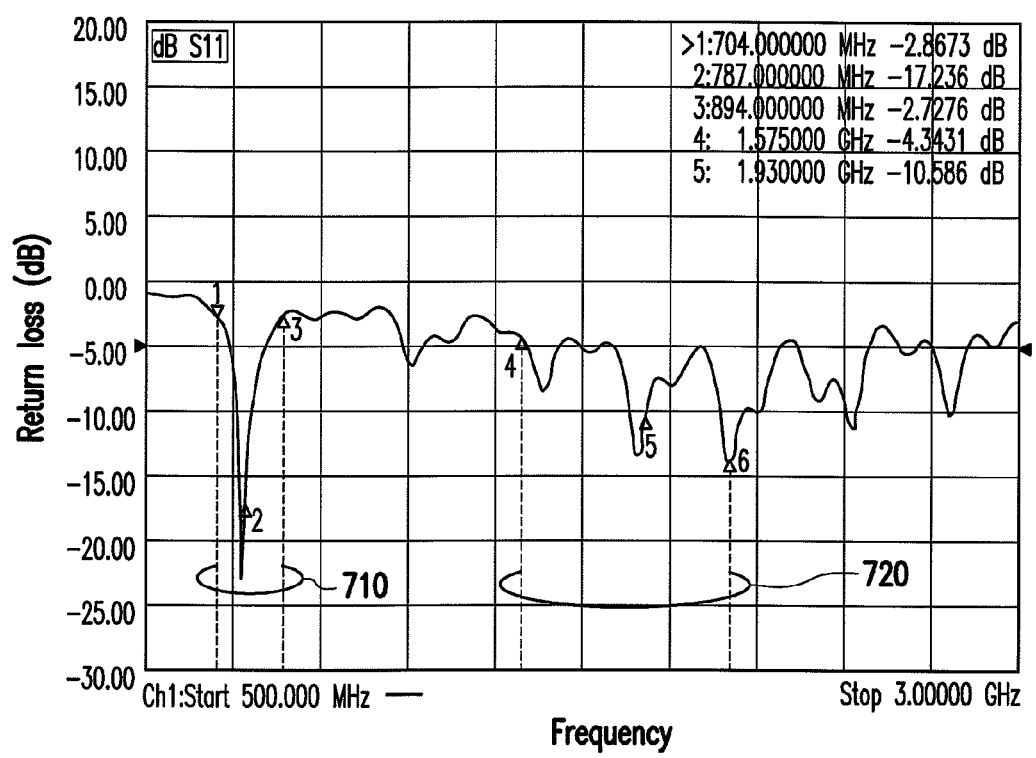
FIG. 7 is a return loss diagram of the antenna element according to another embodiment of the invention.

For instance, FIG. 7 is a return loss diagram of the antenna element according to another embodiment of the invention. As shown in FIG. 7, for example, the antenna element 120 described in the embodiment of FIG. 5 may be operated in a first frequency band 710 and a second frequency band 720, and the return loss of the antenna element 120 in FIG. 5 is approximately below −3 dB in the first frequency band 710 and the second frequency band 720. In addition, a width of the sensing element 130 is not greater than (i.e., less than or equal to) a width of the second portion 520, such that influences caused by the sensing element 130 to the antenna element 120 may be further reduced. Furthermore, the inductor 560 electrically connected between the sensing element 130 and the sensing controller 550 can transmit the sensing signal generated by the sensing element 130, and may be used to block the high-frequency signals. Accordingly, influences caused by the antenna element 120 to the sensing element 130 may be further reduced. Detailed description regarding each of components in the embodiments of FIG. 5 and FIG. 6 is similar to that of the embodiments of FIG. 2 and FIG. 3, which is not repeated hereinafter.

In summary, according to the mobile communication device of the invention, the antenna element and the sensing element are respectively disposed on the two surfaces of the substrate to reduce the hardware space occupied by the antenna element and the sensing element. In addition, because the orthogonal projection of the sensing element on the first surface and the orthogonal projection of the second portion of the antenna element on the first surface are overlapped and have the same shape, the mutual interference between the antenna element and the sensing element may be reduced.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A mobile communication device, comprising:
    a substrate, comprising a first surface and a second surface opposite to each other;
    an antenna element, disposed on the first surface and converting a feeding signal into an electromagnetic wave, wherein the antenna element comprises:
        a first portion, receiving the feeding signal; and
        a second portion, electrically connected to a ground; and
    a sensing element, disposed on the second surface and generating a sensing signal in response to proximity of an object, and an orthogonal projection of the sensing element on the first surface and an orthogonal projection of the second portion on the first surface being overlapped with each other and having the same shape.

2. The mobile communication device of claim 1, wherein the mobile communication device further comprises:
    a sensing controller, electrically connected to a connection point of the sensing element to receive the sensing signal, wherein the second portion is electrically connected to the ground through a ground point, and an orthogonal projection of the connection point on the first surface and an orthogonal projection of the ground point on the first surface are overlapped with each other.

3. The mobile communication device of claim 2, further comprising an inductor, and the inductor being electrically connected between the connection point of the sensing element and the sensing controller.

4. The mobile communication device of claim 2, further comprising:
    a conductive hole, penetrating the first portion and the substrate; and
    a transceiver, electrically connected to the first portion through the conductive hole and generating the feeding signal.

5. The mobile communication device of claim 4, further comprising a display panel and a housing, wherein the substrate is disposed between the display panel and the housing, the antenna element faces the display panel, and the sensing element faces the housing.

6. The mobile communication device of claim 5, wherein the sensing controller and the transceiver face the housing.

7. The mobile communication device of claim 1, wherein a first end of the first portion is electrically connected to the second portion, a second end of the first portion is electrically connected to a transceiver through a conductive hole, and the first portion and the second portion form an inverted F antenna structure or a loop antenna structure.

8. The mobile communication device of claim 1, wherein a first end of the first portion and the second portion are spaced apart by a coupling distance, a second end of the first portion is electrically connected to a transceiver through a conductive hole, and the first portion and the second portion form a coupling-type monopole antenna structure.

9. The mobile communication device of claim 1, wherein a width of the sensing element is not greater than a width of the second portion.

10. The mobile communication device of claim 1, wherein the antenna element and the sensing element are disconnected to each other.

* * * * *